Jan. 6, 1942.  R. R. CURTIS  2,268,805
AIRCRAFT FUEL PUMP
Original Filed July 13, 1939  2 Sheets-Sheet 2
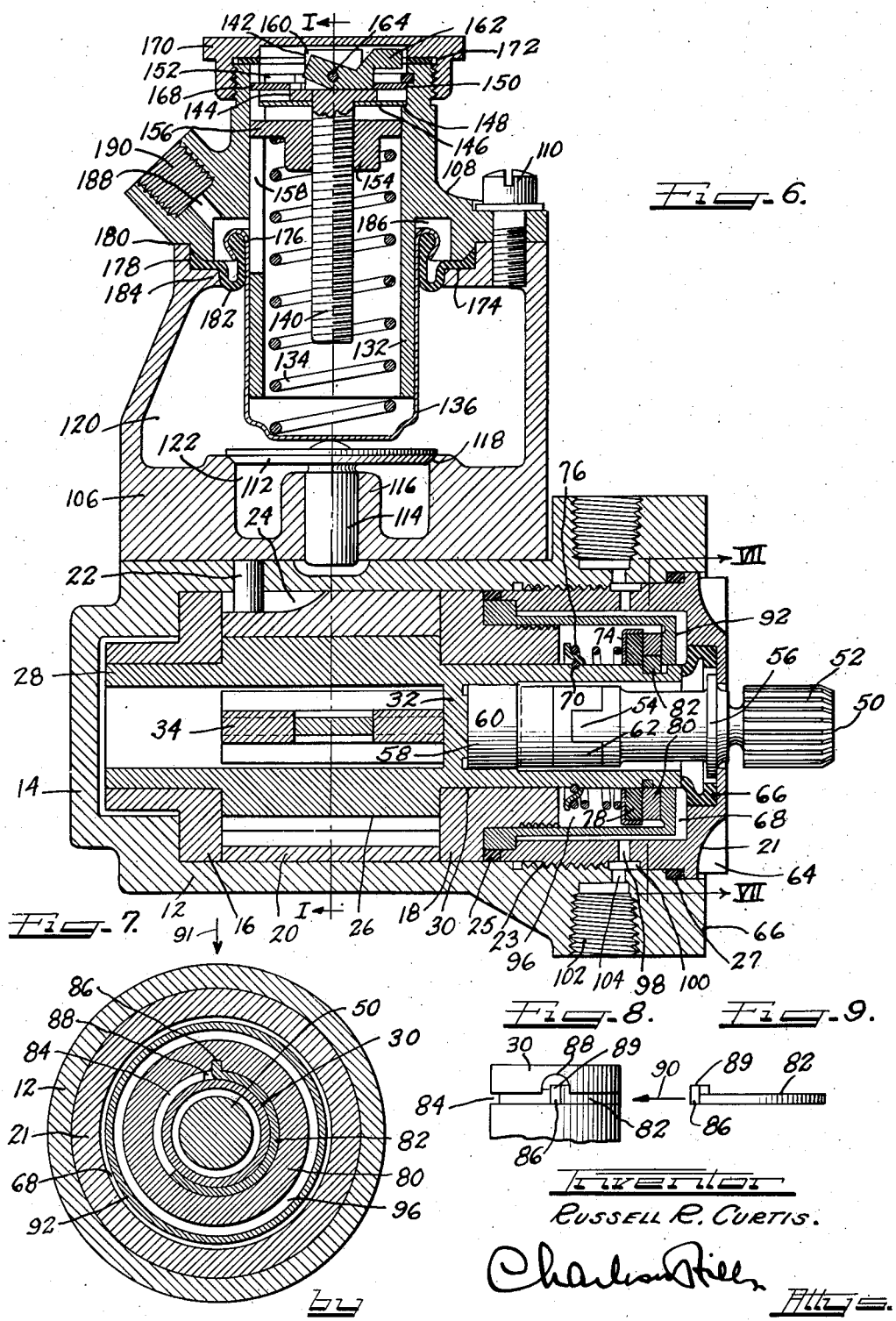
Inventor
RUSSELL R. CURTIS.
by Charles Hill
Attys.

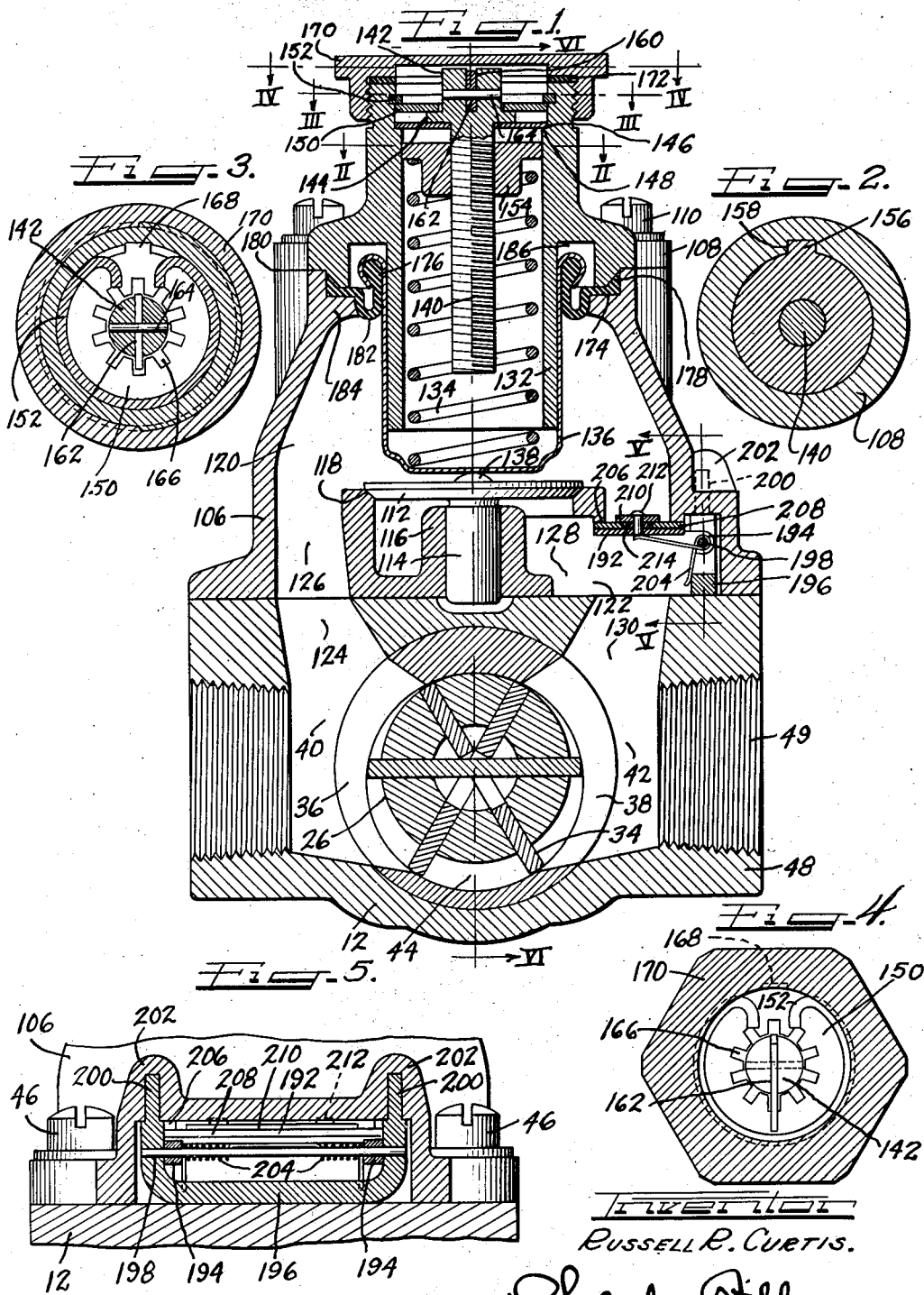

Patented Jan. 6, 1942

2,268,805

UNITED STATES PATENT OFFICE 2,268,805

AIRCRAFT FUEL PUMP

Russell R. Curtis, Dayton, Ohio, assignor to Curtis Pump Company, Dayton, Ohio, a corporation of Ohio Original application July 13, 1939, Serial No. 284,263. Divided and this application March 4, 1940, Serial No. 322,203

6 Claims. (Cl. 74—509)

This invention is a division of my copending application Serial No. 284,263, filed July 13, 1939, and relates to fuel pumps for aircraft engines, particularly to mechanism for maintaining at a constant value the preselected pressure on the discharge side of the pump.

An object of the invention is to provide the relief valve which connects the discharge and suction sides of the pump for maintaining the discharge pressure at a constant value, with a simple, and highly effective means for adjusting the loading of the valve whereby slight variations in the discharge pressure may be had without undue fineness in the adjusting mechanism.

Since it is highly important that the discharge pressure remain constant at the selected value to which it is adjusted, it is another object of this invention to provide a simple but effective locking means which will positively lock the adjusting means in the position selected.

Due to space restrictions in aircraft engine compartments, it is often necessary to mount the fuel pumps in rather inaccessible positions, and it is therefore another object of this invention to so construct and arrange the relief valve adjusting and locking mechanism that unlocking, adjusting, and relocking may be accomplished with several simple movements and with one hand.

Due to the fact that fuel tanks in aircraft are usually remotely located with respect to the fuel pump, it is inevitable that the various angles which the craft assumes in flying, frequently alter the suction head on the intake side of the pump, and it is therefore another object of this invention to provide simple yet accurate compensating means whereby this negative loading of the relief valve due to increased suction on the low side will not affect the pressure on the discharge side for which the valve has been adjusted.

Other objects, advantages, and meritorious features will become apparent as the invention is described in greater detail, with reference to the drawings, wherein:

Fig. 1 is a vertical section through the pump taken at 1—1 of Fig. 6 and bisecting the relief valve.

Fig. 2 is a horizontal section taken at 2—2 of Fig. 1 to show the load adjusting nut.

Fig. 3 is a horizontal section taken at 3—3 of Fig. 1 to show the spring ring for holding the adjusting screw and related parts of the load adjusting means in place.

Fig. 4 is a horizontal section taken at 4—4 of Fig. 1 to show the means for locking the load adjusting screw.

Fig. 5 is a vertical fragmentary section, taken at 5—5 of Fig. 1 through the hinge of the bypass valve.

Fig. 6 is a vertical axial section through the pump taken at 6—6 of Fig. 1 showing the relief valve load adjusting mechanism, the suction head compensating mechanism, and the pump drive with its universal joint and seals.

Fig. 7 is an axially transverse section taken through Fig. 6 at 7—7 to show the fuel seal ring and its special driving key.

Fig. 8 is a fragmentary view of the end of the pump shaft with the special driving key in place.

Fig. 9 is a side view of the driving key.

Like numerals refer to like parts throughout the several views.

The pump body 12 is closed by a rear end wall 14 (see Fig. 6) and bored intermediate the ends to concentrically support the rear bearing 16, the front bearing 18, and the eccentrically bored pump cylinder 20. The bearings and cylinder are preferably press fitted one against the other in the body, the cylinder being additionally positioned and held against rotation by the pin 22 which extends through the body into a keyway 24, preferably cut in the thicker portion of the cylinder wall. A cup shaped seal nut 21 having external threads 23 fitted to appropriate internal threads in the body 12 closes the open end of the body, and, together with resilient seal rings 25 and 27 holds the bearings and cylinder in place and provides against leakage between the seal nut and body.

The rotor 26 has a rear journal 28 and a front journal 30 rotatable in bearings 16 and 18 respectively. The rotor is hollowed for lightness and other reasons, a blind hole extending into the rear journal and through the rotor body and another into the front journal, a partition wall 32 separating the inner ends of the two holes.

The rotor 26 is transversely slotted to slidably receive the three through-blades 34 (see Fig. 1), the cylinder bore and ends of the blades being so formed that the blade ends contact the cylinder wall at all points in their rotation.

The cylinder 20 has slots 36 and 38 positioned to align with ports 40 and 42 in the body 12.

With rotation in the direction of the arrow 44, Fig. 1, 40 becomes the suction port and 42 the discharge port, but by merely removing the screws 46, Fig. 5, and turning the entire relief and bypass valve structure 180 degrees on its vertical axis then replacing the screws 46, the pump will be adapted for rotation opposite to the arrow 44, whereupon 42 is the suction and 40 the discharge port. No other change is required. Opposite hubs 48 are pipe tapped at 49 for suction or discharge pipes as required.

The pump drive comprises a drive shaft 50 externally splined on its outer end as at 52 to slidably enter corresponding internal splines in the end of an engine shaft or other power take off. The inner end has a driving tongue 54. A collar 56 intermediate the ends holds the shaft from any appreciable axially outward movement.

At the bottom of the hole in the front journal 30 adjacent the partition 32 is a driving member 58 which is secured in driving relation to the journal 30 by a plurality of relatively fine serreations 60 cut exteriorly on the member and heat treated to a high degree of hardness. Near the bottom, the interior surface of the hole in the journal may be left soft so that when the member 58 is pressed into the hole it will cut its own splines for joining the member and shaft in driving relation.

The outer end of the member 58 is transversely slotted to slidably receive a corresponding tongue in the Oldham coupling member 62, the outer end of the coupling member being transversely slotted at 90 degrees from its tongue to fit slidably over the tongue 54 on the inner end of the drive shaft 50. The hole in journal 30 is enough larger than the outer diameter of the coupling 62 and shaft 50 to allow for considerable universal action of the shaft.

A pilot 64 on the seal nut 21 is adapted to enter a corresponding recess in the end of the engine bearing to effect substantial concentricity between the engine and pump axes, the flange 66 being bolted to the engine by screws (not shown), whereby lubricating oil from the engine bearing may readily find its way to the Oldham coupling member 62 and its cooperating parts.

A sealing ring 66, preferably of molded synthetic rubber or similar material is pressed into a counterbored opening in the inner face of the seal nut 21. The ring 66 is of somewhat greater overall dimensions axially as it comes from the mold than it is when in place as shown, whereby the face of the ring after assembly exerts a considerable axial pressure against the end face of the journal 30, thereby effectively preventing any substantial amount of oil from the engine bearing or from the interior of the journal from escaping into the drain space 68 or other parts of the pump.

In order to prevent such leakage of fuel as may escape between the front bearing 18 and the front journal 30 from passing through and into the drain space 68, a highly effective seal must be provided. A spring ring 70 is snapped into a groove in the outside of the journal 30 to hold a spring retaining washer 72, against which one end of the seal spring 74 bears.

The other end of the seal spring bears against a cup 76 which contains the packing ring 78. Ring 78 may preferably be made of synthetic rubber, the hole being of such size as to fit the outside of the journal 30 tightly so as to prevent leakage between the outside of the journal and the inside of the ring.

A seal ring 80 is compelled to rotate in unison with the journal 30 by a key 82. Due to the fact that the wall of the journal is relatively thin, and the fact that the key must be removable to allow the spring retaining washer 72, cup 76, and packing ring 78 to be assembled and removed, the key is of special construction.

Key 82 fits slidably in an annular groove 84 in the outside of journal 30 (see Fig. 7) and comprises a rectangular strip bent to somewhat over a half circle and with enough resiliency to snap over the shaft diameter in the bottom of the groove. The upper end of the strip is bent radially outward to compose the key part 86 which enters a keyway in the seal ring 80 to drive it.

In order to provide rotary driving connection of the key 82 with the journal 30, the annular groove 84 is provided with a semicircular inflection 88, in one edge and the upturned end 86 is widened as at 89 at this point to extend into this inflection. Fig. 8 shows the outer end of the journal with the key in place as viewed in the direction of the arrow 91, Fig. 7, while Fig. 9 shows the key viewed in the direction of the arrow 90 but removed from the journal.

Owing to the fact that externally to internally threaded together members are not conducive to extreme concentricity one with the other, and the further fact that slight distortion might occur in pressing the seal seat into place, the seal seat is not carried in the seal nut 21, but on the end of a separate cup shaped seal housing 92 especially provided for the purpose.

The outside of the front bearing 18 should be finished truly concentric with the bore and the seal housing 92 fitted closely thereover. The end face of the housing and the shoulder on the bearing 18 which are in contact must both be faced to a true plane at right angles to the pump axis.

The external threads 94 which appear on the bearing 18 are provided for pulling the bearing out when disassembling the pump, there being no corresponding internal threads in the seal housing 92 which is clamped in place only by the seal nut 21. The resilient seal rings 25 and 27 are made enough wider than the space they ultimately occupy that when the nut 21 is drawn solidly against the seal housing, the rings will be under proper compression to make a tight joint.

The surfaces of the seal ring 80 and seal housing 92 which are in relatively rotatable contact are preferably finished to mirror-like smoothness and are kept in rubbing contact by the spring 74 which presses the cup 76 against the packing ring 78 which in turn presses against the seal ring 80, the parts 70, 72, 74, 76, 78, and 80 all having unitary rotation with the journal 30.

It will be seen that any fuel escaping between the bearing 18 and journal 30 is caught in the seal chamber 96. The amount of leakage fuel escaping from chamber 96 is extremely small because of the tight fit of the packing ring 78 over the journal 30 and the spring pressure contact of the packing ring with the seal ring 80 all of which surfaces have unitary rotation, as well as the spring pressure contact of the highly finished metallic contacting surfaces between the rotatable seal ring 80 and the stationary seat in the end of the seal housing 92.

Since some slight leakage may at times occur from the seal chamber into the drain space 68, the small hole 98 connects the space 68 with an annular groove 100 encircling the seal nut 21 which in turn is connected with the pipe tapped holes 102 by the small holes 104. Opposite drain holes are provided so that the pump may be mounted the other side up when desired.

One advantage of the combination seal and drive will be obvious. The rotatable seal ring 80, being carried on the journal 30, and not on the drive shaft 50 as in general practice, is not subject to eccentric rotation tending to unseat it when the drive shaft makes use of its universal joint to rotate eccentrically under slight misalignment.

The arrangement possesses the further advantage that any fuel which gets past the rotatable seal ring 80 must do so by moving radially inward against the action of the centrifugal force of its own weight, whereas the escape past a seal which is placed directly at the end of the bearing, as is usually done, is aided by the action of centrifugal force.

The flexible sealing ring 66 permits direct communication between the oil supply of the engine bearing and the universal joint, whereby the joint is adequately lubricated, but prevents any considerable engine oil escaping into the drain space 68 or back into the pump, such fuel as escapes into the drain space being prevented from mixing with the engine oil.

The relief valve structure, provided for maintaining the discharge pressure at a constant value, is housed in a valve body 106 which is secured to the pump body 12 by the screws 46, and a valve head 108 secured to the main valve body 106 by the screws 110.

The relief valve proper is of the poppet type comprising the disc 112 with stem 114 slidable in a hub 116 of the main body 106, the disc being beveled at 118 and having a corresponding angular seat in the body which divides the interior of the body 106 into a suction chamber 120 including all of the space above the disc 112 and a discharge chamber 122 being the space below the disc.

Ducts 124 and 126 in the pump and valve bodies respectively, connect the suction port 40 to the suction chamber 120, while ducts 128 and 130 in the valve body and pump body respectively, connect the discharge chamber 122 to the discharge port 42.

Depending from the valve head 108 into the suction chamber 120 is a long hub 132 internally chambered to contain the valve loading spring 134 and externally sized to slidably receive the valve spring cup 136 the bottom of which rests upon a small knob 138 on the upper side of the valve disc 112.

The valve spring adjusting means comprises an adjusting screw 140 with a head 142 and a flange 144 intermediate the screw and head, the flange being of larger diameter than the head. The lower adjusting screw retaining washer 146 rests on a shoulder 148 and has a central opening through which the screw extends freely, the flange 144 resting on the upper face of the washer. The upper retaining washer 150 has a central opening which passes over the screw head 142 loosely and rests on the flange 144. A spring ring 152 is snapped into a groove at the upper edge of the washer 150, the groove being positioned to hold the two washers so spaced as to allow free turning movement of the flange 144 between them.

The spring adjusting nut 154 is tapped to fit the external threads of the screw 140 and has a key 156 extending laterally into the keyway 158 of the valve head 108, whereby the nut is held nonrotatable when the screw is turned, yet may move freely in an axial direction.

The head 142 of the adjusting screw is provided with a deep screw driver slot 160 in which the locking bar 162 is fitted snugly and is hinged therein by the pin 164. The hole in the upper retaining washer 150 has a series of radial notches 166 (see Fig. 3 or 4) into any one of which the lower edge of the locking bar 162 may be entered as shown. The washer 150 also has a key 168 at its outer edge which extends into the keyway 158 to hold the washer 150 from rotating.

The adjusting screw cap 170 when drawn tightly to the gasket 172, allows but a slight clearance between the inside of the cap and the top of the locking bar 162, whereby the bar is retained in the notch in which it has been placed as long as the cap is in position.

When an adjustment of the spring 134 is to be made, the cap 170 is first removed, then, by the simple insertion of a screw driver into the screw slot 160, the locking bar 162 is made to rise out of its notch 166 of the washer 150 and the screw may be rotated until the desired adjustment is attained, whereupon the locking bar is pushed into the nearest notch and the cap 170 replaced. In a situation where it may be necessary to reach into close spaces to make this adjustment, the desirability of this simple manipulation is obvious. Furthermore, where height is limited, as it is on pumps of this class, a small portion only of the available height is taken by the adjusting and locking means, leaving space for a longer and more flexible spring, whereby larger increments of adjustment may be made with smaller resulting variations in spring stress, making the matter of adjusting for fine variations in discharge pressure not dependent upon skillful or careful manipulation of the adjusting means. The use of a longer and more flexible spring also results in less variation in the discharge pressure at the various speeds of rotation and rates of discharge encountered in the operation of aircraft.

Now, as is well known in the art, the suction head against which the pump operates varies from one instant to the next because of aircraft acceleration, or deceleration, or altitude, or the fact that the fuel tank, when the craft climbs, may be well below the pump, and when it dives, it may be well above it, or vice versa, all depending upon the respective locations of the pump and tank, so that, if an ordinary spring loaded relief valve only were provided, the constant rise and fall of the pressure in chamber 120 would constantly influence the discharge pressure, because the sum total of effort acting against the spring to open the valve would be the discharge pressure, acting to raise the valve from below, added to the suction tending also to raise it but from above. Valves for use in this situation are therefore provided with a balancing means whereby variation in the suction does not add to nor subtract from the forces tending to open the valve, and therefore does not affect the discharge pressure.

The relief valve balancing means herein provided comprises a diaphragm 174 of resilient synthetic rubber preferably with an internal fabric layer (not shown) to give it additional strength. Around the edge of the central opening the material is thickened to provide a ring 176 around which the upper edge of the spring cup 136 is so closely rolled as to form an air tight joint at this point, and prevent the cup and diaphragm from pulling apart in operation.

The diaphragm is also made thicker at the outer edge to form the wedging ring 178, this ring and a small portion of the diaphragm being clamped between the valve body 106 and head 108.

Since the material of the diaphragm is subject to cold flow under excessive pressure, the space between the body 106 and head 108 which contains the outer edge must be carefully made so that when metal to metal contact of the body and head is made at 180, the diaphragm will be gripped tight enough to safely prevent pulling out under the suction pressure in operation, but not tight enough to cause cold flow.

The active portion 182 of the diaphragm is of U shaped cross section which loops downward between the outside of the cup 136 and the inner edge of the annular rib 184 in the body 106.

Since the material composing the diaphragm swells appreciably from gasoline absorption, the loop 182 will drop downward more as the material swells. It will also be drawn upwardly farther as the valve rises to its maximum height. If then, the effective area of the diaphragm is to remain constant under both of these extremes, the sides of the U loop must be so supported as to maintain a constant width under all conditions.

This condition will be met when the drop in the loop 182 and the width of the rib 184 is such that the sides of the loop will be held parallel and to a uniform spacing with each other in all positions. In such a structure the effective area of the diaphragm will be constant for any valve lift and for any degree of swelling of the material, and the discharge pressure will be unaffected by these variations.

The space above the diaphragm, in the form of a chamber 186, is usually connected by a hole 188 to the atmosphere, but may be connected to the intake manifold when a supercharger is employed, by a pipe fitted to the pipe tapped opening 190, causing the fuel discharge pressure to increase directly with rise in manifold pressure.

Obviously, increased suction in the chamber 120 will pull as much harder downwardly on the cup 136 as it does upwardly on the valve disc 112, and the valve closing pressure will be controlled entirely by the spring 134 independently of variations in suction head.

A bypass valve is usually incorporated in the relief valve body of the power pump of aircraft fuel systems, so that, in the event of sticking of the power pump rotor, or other power pump failure, fuel may be forced through the power pump, independently of its pumping elements, by means of an auxiliary hand pump provided for the purpose.

Heretofore, these bypass valves have been made with a metal to metal seat, necessitating considerable initial spring pressure to hold them closed when not operating, and have not been so placed as to provide the greatest freedom in the passages through them, whereby considerable hand pump effort was required to overcome these innate resistances before hand pumping became effective.

The bypass valve herein disclosed is of improved design. It is of synthetic rubber to metal seat construction, so that a very light spring holds it closed effectively against leakage, and it is so placed and its orifices so shaped, as to provide a substantially direct nonresisting passage for the flow of the hand pumped fuel.

Referring to Figs. 1 and 5, a rectangular metal valve flap 192 having hinge ears 194 is swingably supported in the valve frame 196 by the hinge pin 198, the frame itself being supported in the body 106 by round end portions 200 extending slidably into the holes in bosses 202. The bottom of the frame rests on the upper surface of the pump body 12 whereby the frame is held securely in place as long as the valve body 106 and the pump body 12 are assembled but may be readily removed for repairs to the valve when the pump and valve bodies are separated.

Torque springs 204, surrounding the hinge pin, have free ends which engage the frame and flap, the springs being tensioned to urge the flap to closed position.

Between the flap 192 and the seat 206 on the body 106 there is secured a facing pad 208 of resilient material, preferably a compound of cork and synthetic rubber. A retaining plate 210 lies on top of the facing, and rivets 212 secure the retaining plate to the flap with the facing between.

In order to provide against any distortion in the facing strip and to allow for the swelling inherent in the facing material, the facing strip is provided with spaced apart holes into which the spacing washers 214 fit freely, the center of the washers having holes for the rivets 212. The washers are enough thicker than the facing strip, and enough smaller in diameter than the holes in the strip, that after assembly, the strip will be held between the flap and the retaining plate with such degree of freedom that there will be no distortion even after the anticipated swelling has taken place.

Having described an embodiment of the invention in which the objects hereinbefore set forth are attained, I claim:

1. An adjusting and locking device comprising, a threaded member, an abutment nut threaded upon said member, said member having a headed portion provided at one end thereof with a peripheral flange and at its other end with a screw driver receiving slot, a locking bar rockably mounted within said slot and having an extended end, and a washer loosely disposed about said headed end and adapted to be fixedly held against rotation, said washer having a plurality of radially extending recesses on its inner periphery into any one of which said extended end of the locking bar may be inserted to hold said threaded member against rotation, and said locking bar being rockable out of such recess upon the insertion of a screw driver into said slot to permit said threaded member to be rotated.

2. An adjusting and locking device comprising, a threaded member, a head at one end of said member having a screw driver receiving slot therein, a peripheral flange adjacent said head, fixedly mounted spaced apertured washer means of greater diameter than said peripheral flange, said washer means having said threaded member slidably extending therethrough with the peripheral flange rotatably seated therebetween, one of said washer means having a plurality of radial recesses on its inner periphery, and a locking bar rockably mounted in the head slot of said threaded member and having a portion movable into and out of said radial recesses.

3. An adjusting and locking device comprising, a threaded member, a head at one end of said member having a screw driver receiving slot therein, a peripheral flange adjacent said head, fixedly mounted spaced apertured washer members having said threaded member extending therethrough and the peripheral flange rotatably seated therebetween, the washer member adjacent the head of said threaded member having a plurality of radially extending recesses on its inner periphery, a planar locking bar pivotally mounted on the head of said threaded member within said screw driver receiving slot, said locking bar having a body portion extending beyond said slot and terminating in an offset end, said extending body portion of the locking bar being arranged to be rocked into and out of one of said radial recesses for locking and unlocking the rotatable threaded member, and means arranged for mounting adjacent the head of said threaded member for restricting movement of the offset end of said locking bar and maintaining the extending body portion of the locking bar in seated engagement with one of said radial recesses.

4. An adjusting and locking device comprising a hollow housing, a threaded member axially mounted on said housing for rotation, an abutment nut threaded upon said member, said member having a headed end provided with a screw driver receiving slot, a locking bar rockably mounted within said slot and having an end extending beyond the head of said member, a washer member carried by said housing and having a plurality of recesses for receiving the extending end of said locking bar, said threaded member being free for rotation when the extending end of said bar is rocked out of engagement with one of said recesses and being locked against rotation when rocked into one of said recesses, and cap means for sealing the end of said housing and maintaining the extending end of said locking bar in engagement with one of said recesses.

5. An adjustment and locking device comprising a hollow housing, an axial wall slot extending partially along the length of and on the inside of said housing, a pair of spaced apertured washers peripherally mounted within said housing, one of said washers having a plurality of radially extending recesses on its inner periphery, a threaded member having a transversely extending flange adjacent one end and rotatably seated between said washers, a head on said member extending through said one washer and having a screw driver receiving slot therein, a locking bar pivotally mounted within said head slot and having a portion extending beyond said slot for seating engagement within one of the radial recesses on said one washer, said extending portion having an offset end, an abutment nut having a key portion on its pheriphery extending into the wall slot in said housing and threadedly receiving therethrough the threaded member, and a cap for said housing being closely spaced from the offset end of said locking bar for maintaining the extending portion in seated engagement within one of said radial recesses.

6. An adjusting and locking device comprising a tubular housing having an axial slot extending partially lengthwise along the inside thereof, a shoulder on the inner periphery of said housing adjacent one end thereof, an apertured washer seated on said shoulder, a screw member having a threaded shank, a headed end and a peripheral flange therebetween, said threaded shank extending through said washer and the peripheral flange being rotatably seated thereon, an abutment nut threaded on said shank and having a peripheral key seated within the axial slot of said housing, a second apertured washer loosely embracing the headed end of said screw member and being seated on said peripheral flange, a resilient ring seated in said housing and against said second washer for maintaining the latter seated on said peripheral flange, a screw driver receiving slot in the headed end of said screw member, a planar locking bar pivoted to said headed end within said slot, said bar having a body portion extending beyond the end of said slot and terminating in an offset end, said second apertured member having a plurality of radially extending notches on the inner periphery thereof into any one of which said extending body portion of the locking bar may be inserted to hold said threaded member against rotation, and a removable sealing cap on said one end of the housing closely spaced from the offset end of said locking bar for maintaining the extending body portion thereof in seated engagement within one of the radial recesses.

RUSSELL R. CURTIS.